(12) United States Patent
Kihneman et al.

(10) Patent No.: US 7,788,257 B2
(45) Date of Patent: Aug. 31, 2010

(54) EASY-TO-USE DATA REPORT SPECIFICATION

(75) Inventors: Brian E. Kihneman, Seattle, WA (US); Clinton D. Covington, Kirkland, WA (US); Pavel R. Karimov, Redmond, WA (US); Robert Cooper, Woodinville, WA (US); Zachary P. Woodall, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 11/925,671

(22) Filed: Oct. 26, 2007

(65) Prior Publication Data

US 2008/0046403 A1     Feb. 21, 2008

Related U.S. Application Data

(62) Division of application No. 11/020,940, filed on Dec. 23, 2004, now Pat. No. 7,289,976.

(51) Int. Cl.
*G06F 17/30* (2006.01)

(52) U.S. Cl. ...................................... 707/722

(58) Field of Classification Search ............ 707/2, 707/10, 722; 705/27
See application file for complete search history.

(56) References Cited

U.S. PATENT DOCUMENTS

| | | | |
|---|---|---|---|
| 6,996,569 B1 | 2/2006 | Bedell et al. | 707/100 |
| 7,289,976 B2 | 10/2007 | Kihneman et al. | 707/1 |
| 2003/0167213 A1* | 9/2003 | Jammes et al. | 705/27 |

OTHER PUBLICATIONS

U.S. Office Action, Non-Final, issued in U.S. Appl. No. 11/020,940, dated May 2, 2007.
Notice of Allowance, issued in U.S. Appl. No. 11/020,940, dated Aug. 27, 2007.

* cited by examiner

*Primary Examiner*—Etienne P LeRoux
(74) *Attorney, Agent, or Firm*—Merchant & Gould PC

(57) ABSTRACT

A method and system for the graphical specification and modification of reports is disclosed which enables data reports to be easily created via a report design dialogue. The report design dialogue includes a group-level outline panel containing controls for grouping, as well as other report controls such as those for sorting and aggregating. A method and system for creating a group-level outline panel using an existing database report is also disclosed. Finally, a computer-readable medium storing a computer-interpretable data structure that stores one or more report specifications is disclosed.

16 Claims, 18 Drawing Sheets

Northwind1 : Database (Access 2000 file format)

Group, Sort, and Total

Group on CompanyName ▼ by entire value ▼ , sort from A-Z ▼ , with OrderID totaled ▼ , with a header section,
with a footer section. More

- RequiredDate
- Click here to add a group level

1702

- by entire value
- by first letter
- by first two letters
- Custom:
  by first [1] letters 1704  1706

Customers - demo : Re

| Company Name | Order ID | Order Date | Required Date |
|---|---|---|---|
| Alfreds Futerkiste | 10643 | 25-Aug-1997 | 22-Sep-1997 |
| | 10692 | 03-Oct-1997 | 31-Oct-1997 |
| | 10702 | 13-Oct-1997 | 24-Nov-1997 |
| | 10835 | 15-Jan-1998 | 12-Feb-1998 |
| | 10952 | 16-Mar-1998 | 27-Apr-1998 |
| | 11011 | 09-Apr-1998 | 07-May-1998 |
| Count | 6 | | |
| Ana Trujillo Emparedados y helados | 10308 | 18-Sep-1996 | 16-Oct-1996 |
| | 10625 | 08-Aug-1997 | 05-Sep-1997 |
| | 10759 | 28-Nov-1997 | 26-Dec-1997 |
| | 10926 | 04-Mar-1998 | 01-Apr-1998 |
| Count | 4 | | |
| Antonio Moreno Taqueria | 10365 | 27-Nov-1996 | 25-Dec-1996 |
| | 10507 | 15-Apr-1997 | 13-May-1997 |

1708

Report View | Print Preview | Layout Preview | Design View

Report View    NUM

FIG. 18

EASY-TO-USE DATA REPORT SPECIFICATION

CROSS-REFERENCES TO RELATED APPLICATIONS

This application is a divisional application of application Ser. No. 11/020,940 filed on Dec. 23, 2004 titled "EASY-TO-USE DATA REPORT SPECIFICATION" which is incorporated herein by reference in its entirety for all that is taught and disclosed therein.

TECHNICAL FIELD

The present invention relates generally to the field of software applications. More particularly, the present invention relates to software applications that store data and report data, such as database applications. More particularly still, aspects of the present invention relate to specifying reports that may include grouping, sorting, and aggregation of data in data reports.

BACKGROUND

In order to manage large quantities of data, computer software applications, such as spreadsheet and database applications, have been developed to organize and store the data in a logical manner. Typical spreadsheet and database applications comprise a large number of records of information, wherein each record comprises a predetermined number of fields. In the context of a database, a database management system is typically used to provide the software tools to manipulate the database more simply. Example database management systems include Microsoft® Access and Microsoft® SQL Server, among others. Databases generally allow users to establish complex data interrelationships, which increases the functionality of database applications but also makes them difficult for new users to understand and master.

A typical database management system provides the user the ability to add, modify or delete data, query data using filters, and the ability to report records in the database. In contrast to filtering, which may remove records from the user's view, reporting simply reorganizes existing records without actually removing any content. Reporting may include grouping (organizing records into groups, hierarchically in the case of multiple groupings), sorting, aggregation (performing numerical processing across one or more groups of records), or other statistical processing of values within records in the database. Moreover, the usual database management system also provides functionality related to maintaining the security and integrity of the database data.

Generating a readable report having large quantities of data in a spreadsheet or database application can be a complex and daunting task, especially to new users. Database applications can be especially difficult to use, since entire query languages are often used (such as Structured Query Language, or SQL) to enable the more sophisticated reports and these languages are complex and have many nuances and are therefore intimidating to new users.

It is with respect to these considerations and others that the present invention has been made.

SUMMARY

In accordance with the present invention, a computer-implemented method is provided for report specification. A signal to perform a grouping is received. In response to the signal, a new group level is created. One or more default values for one or more controls in the new group level are subsequently created. Finally, a grouping is performed according to the default control values, and the results are displayed on a screen.

In accordance with other aspects, the present invention relates to a computer-implemented method for creating a group-level outline panel using an existing database report. A signal is received to open an existing report. The existing report is opened, parsed, and analyzed to determine its group structure. A report dialogue is then generated using the group structure, and the report dialogue is displayed on a screen.

In accordance with yet other aspects, the present invention relates to a system for specifying reports. A receiving module receives report control signals and selections relating to a group-level outline panel. A processing module generates a group-level outline panel using an existing report. A creation module creates a new group level and sets default values for the new group level. A grouping module performs a database grouping. A sorting module performs a database sorting. An aggregating module performs a database aggregation. Finally, a display module displays a group-level outline panel, and displays results of database groupings.

In accordance with still other aspects, the present invention relates to a computer-readable medium storing a computer-interpretable data structure that stores one or more report specifications. The data structure includes one or more groupings, each grouping corresponding to a database field, and one or more controls, each control corresponding to a report specification option.

The invention may be implemented as a computer process, a computing system or as an article of manufacture such as a computer program product or computer readable media. The computer readable media may be a computer storage media readable by a computer system and encoding a computer program of instructions for executing a computer process. The computer program readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 1 shows a database environment in which an embodiment of the present invention may be implemented and which further illustrates a tabular view having records in an arbitrary order that may be grouped in accordance with aspects of the present invention.

FIG. 13 illustrates an example screenshot showing contextual selection in a report creation dialogue.

FIG. 14 illustrates an example screenshot showing contextual selection in a report creation dialogue.

FIG. 17 illustrates an example screenshot showing a dialogue for the creation and modification of a grouping, and a prompt for the refinement of a grouping.

FIG. 18 illustrates an example screenshot showing a dialogue for the creation and modification of a grouping, and data resulting from a refinement of a grouping.

DETAILED DESCRIPTION OF THE INVENTION

Figure 1:
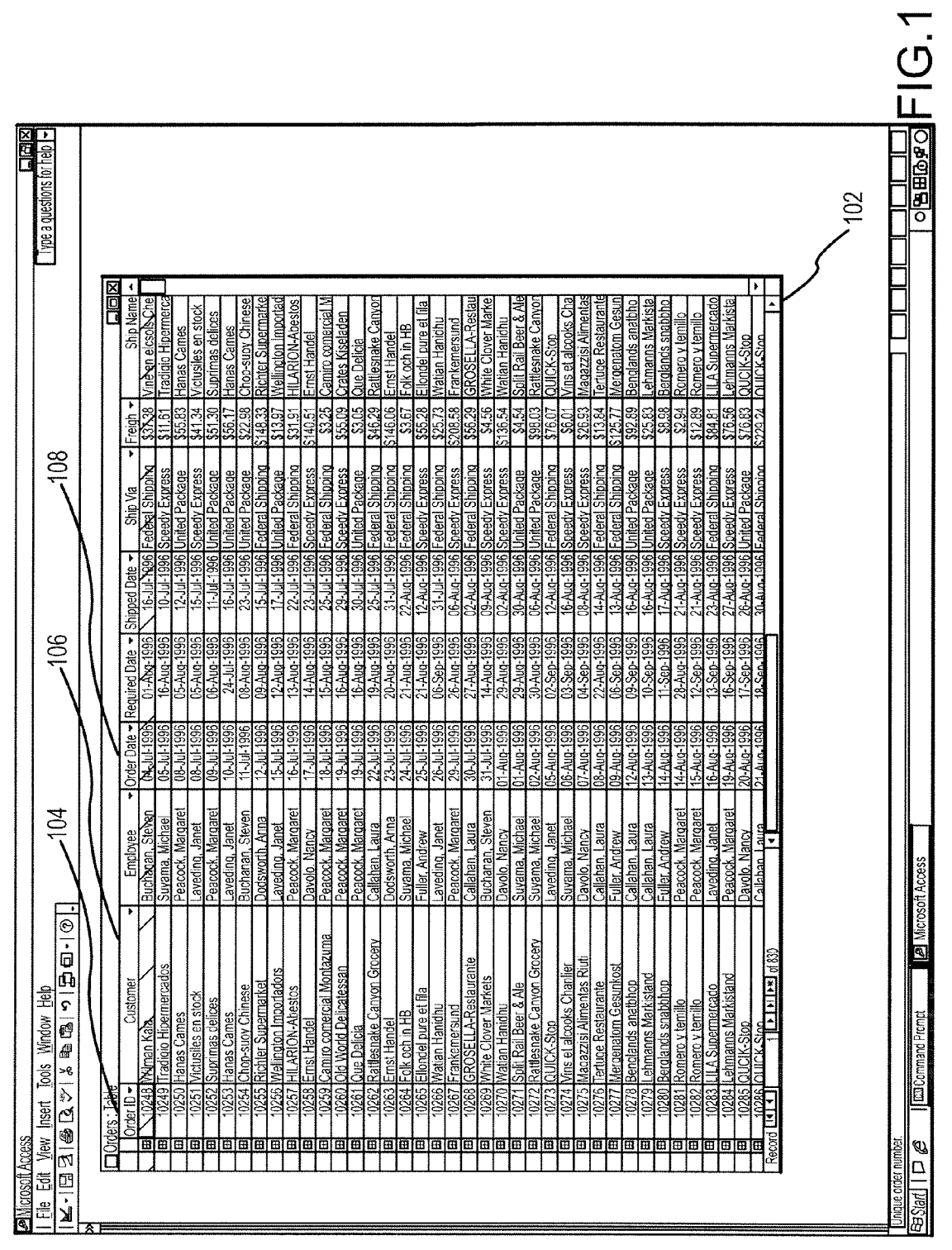

FIG. 1 illustrates a screenshot of a tabular view (also known as a table 102) of a product order database within a database management system. The table 102 includes a table comprised of multiple rows and columns of data. Each row of data generally comprises a single data record. Generally, each column of data in a database has data elements of a homogenous type. For example, the Order ID column 104 includes data elements in numeric format, the Customer column 106 includes data in the form of alphanumeric strings, the Order Date column 108 includes data in date format, and so on. The Order ID column of a single record corresponds to that Order ID field of that record. A collection of fields may comprise a column. One skilled in the art will appreciate that many other types of data can be kept in a database, and displayed using a table within a database management system.

Prior to the present invention, users had to manually formulate and modify reports using a suitably structured query language (generally by designing and typing in query commands) in order to produce display 102. Alternatively, in some applications such as Microsoft® Access, a wizard assisted users with the creation of reports, but users had no mechanism for easy editing of existing reports. Further, some wizards do not provide the real-time feedback of effecting report changes as they are made, but rather, only perform reporting once a report has been specified in its entirety.

The present invention, by allowing a graphical dialogue for real-time creation and modification of reports using a report specification written in plain English sentences, solves many problems in the prior art and allows database and spreadsheet products to be more accessible than ever before to new users, as discussed in more detail below.

Figure 2:
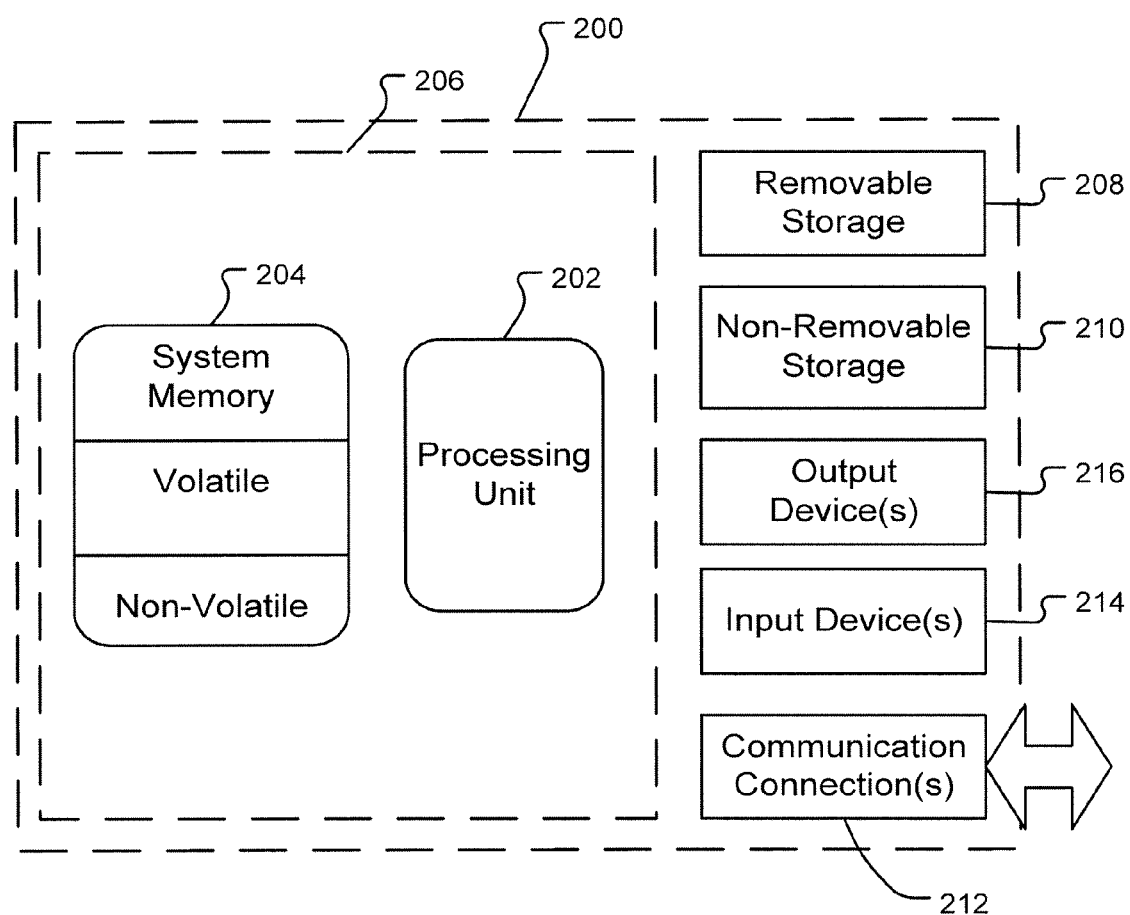
FIG. 2 illustrates an example of a suitable computing system environment on which an embodiment of the present invention may be implemented.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. By way of example, and not limitation, communication connection(s) 212 includes a wired network or direct-wired connection, and wireless connections such as acoustic, RF, infrared and other wireless media. The term computer readable media as used herein includes both storage media and communication media.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

Figure 3:
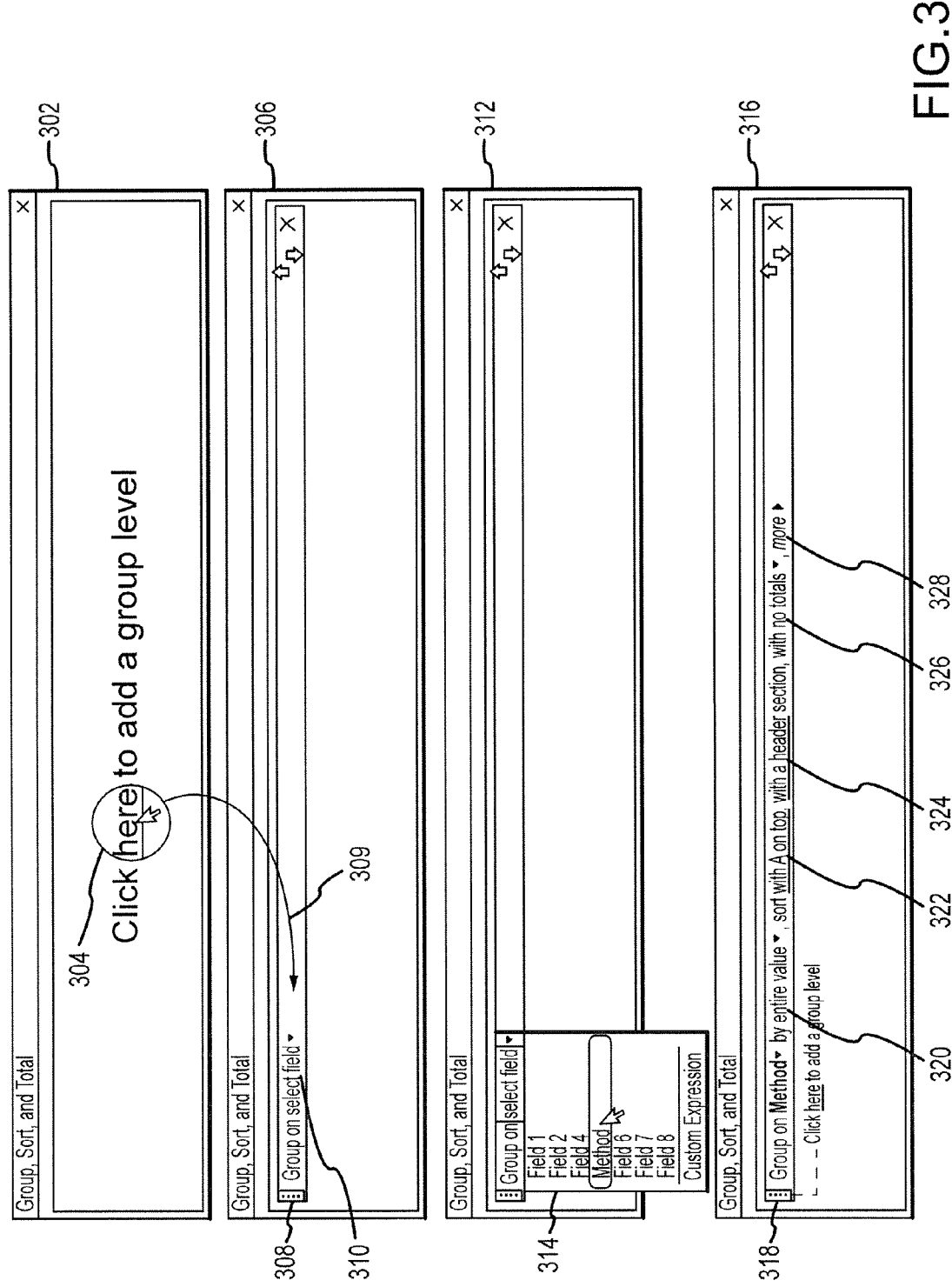
FIG. 3 illustrates example screenshots showing a dialogue for the creation and modification of a report.

FIG. 3 illustrates example screenshots showing a dialogue during creation of a report. Four dialogue windows 302, 306, 312 and 316 are shown which depict the operational flow of one embodiment of the present invention in which a user creates a report. The dialogues depict a report creation dialogue after successive operations. That is, in one embodiment, dialogue window 302 first appears, then dialogue window 306, then dialogue window 312, and finally dialogue window 316. For a discussion of data report changes resulting from operations in a report creation dialogue, see FIGS. 9-18 and their corresponding descriptions.

As can be seen in dialogue 302, a specified control 304 within dialogue 302 may be selected. One skilled in the art will appreciate that this control 304 need not be located within the report dialogue itself. Rather, control 304 could appear anywhere on a computer desktop or other computer display abstraction and still fall within the scope of the present invention. Likewise, a keyboard, mouse, or other input device could be used to signal a report dialogue instead of a clickable control 304. In an embodiment, the controls, when read from left to right, comprise an English language sentence describing the effects of a given group-level outline panel. This easy-to-read format not only makes the group-level outline panel easier to use, but also makes it clearer to the user what the effects of a given modification to a group-level outline panel will be. In one embodiment, the structure of a group-level outline panel shows how grouping, sorting, and aggregation settings may affect one another. For example, "group on x, sort by y," when read left to right, may be used to indicate that first records will be grouped, and then the resulting groups will be sorted. Similarly, "group on x, and aggregate" may be used to indicate that first records will be grouped, and then the resulting groups will be aggregated.

After control 304 has been activated, dialogue 302 is replaced by dialogue 306, which includes a group-level outline panel 308. Arrow 309 is displayed to indicate that selection of control 304 causes the display of group-level outline panel 308. Group-level outline panel 308 prompts the user to select a field on which to group using prompt 310. In one embodiment, prompt 310 is displayed in a different color to make it clear to the user that it can be modified. In other embodiments, prompt 310 may be highlighted using a bold font, an italicized font, by underlining one or more words associated with the prompt, or other method of calling attention to text. In yet another embodiment, non-alphabetical symbols may be used to signify a prompt 310. In still another embodiment, all group-level outline panel text may appear with the same color and effects. One skilled in the art will appreciate that a dialogue box may be reused, instead of replaced, without departing from the scope of the claimed invention.

If prompt 310 of dialogue 306 is selected, dialogue 306 is replaced with dialogue 312. Dialogue 312 includes a group-level outline panel 308 as in dialogue 306, but with the addition of a pulldown menu 314 that lists database fields (table columns) by which records may be grouped. Selecting a field from pull down menu 314 causes grouping to be performed (Method is the name of the selected field in exemplary dialogue 312). Following selection, the dialogue 312 is replaced with dialogue 316 and group-level outline panel 318 is expanded to include additional report controls 320, 322, 324, and 326 as shown in dialogue 316. Further, a "more" control 328 appears which can be used to make still more report controls appear. Report controls 320, 322, 324, and 326 are initially set to default values, discussed below in conjunction with FIG. 4.

One skilled in the art will appreciate that dialogue boxes 302, 306, 312 and 316 may be reused, instead of replaced, without departing from the scope of the claimed invention.

In the interest of economy of desktop space (to avoid cluttering the dialogue with controls that are needed only rarely), only the most frequently used controls are presented in a group-level outline panel in the exemplary embodiment. In another embodiment, features that a developer wishes to advertise (i.e., powerful features of which users may not be aware) may be placed in a group-level outline panel. As may be appreciated, an aspect of some embodiments of the present invention relates to identifying and displaying information and associated controls likely to be used and/or needed to build a report. To that end, a further embodiment only expands the details of a selected group level of the group-level outline panel. Such limited display reduces clutter, which reduces potential confusion, such as when many group levels exist thereby making it easier for users to discern which phrases are relevant to their current selection.

In the exemplary embodiment of group-level outline panel 318, "by" control 320 is a frequently needed report modifier. "By" control 320 is used to select whether a group is defined to include records with an entire value in common, or only with a portion of a value in common. Sort control 322 determines in what order the resulting record groups are sorted. Sort control 322 provides context-sensitive control for sorting grouped data. This means that for an alphabetical or alphanumeric field, grouped records may be sorted in various orders based on the starting letter (e.g., "with A on top," or "with Z on top"), as shown in exemplary dialogue 316. In another embodiment, numeric fields may yield a "with 0 on top" sort direction control, a "with 9 on top" sort direction control, etc. In this way, the English language description of the report changes dynamically based on the selected field or table column being grouped.

Header control 324 controls whether a header (a separating space at the top of a group level) will be placed in the report. Headers serve to visually differentiate group levels from one another. Footers serve the same function, except that they appear at the bottom of a group level, and may be similarly enabled using header control 324.

Totals control 326 allows users to aggregate records. Aggregation is the numerical processing of values across records, such as summing a group of values, averaging a group of values, computing a minimum or maximum of a group of values, counting the number of a values in a group, etc. By using totals control 326, a report that aggregates across groups may be produced such that each group has its own, independent set of totals. Such a report contains an additional "total" row at the bottom of each group, indicating the sum of the values in a selected column for a selected group. Similarly, totals control 326 can be used to select numeric averaging across groups, numeric median, and other statistical computations.

More control 328 may be used to expand group-level outline panel 318 to include additional controls. Correspondingly, a less control (not pictured) may be used to limit group-level outline panel 318 to only the most frequently needed controls. In an embodiment, more control 328 can be selected repeatedly to make successively more additional controls visible. In another embodiment, which controls are initially visible, and which controls become visible upon successive use of more control 328, is determined by monitoring usage patterns for a user and giving frequently used controls priority of less frequently used controls.

In one embodiment, selecting more control 328, altering one of the newly displayed report controls, and then selecting the less control (not pictured) will result in the newly modified value appearing in the reduced group-level outline panel. In a particular embodiment, any values that are not set to the default should be displayed along with their corresponding control since these affect the resulting report in a non-default manner. If all non-default values are not presented, the user may forget about a modifier being selected and become confused by the resulting report.

The controls presented here are purely exemplary in nature, and do not represent all possible types of controls that may be used in conjunction with the present invention. Likewise, different controls relevant to database reports may be used in place of these exemplary controls without departing from the scope of the claimed invention.

In an embodiment, controls are chosen based on the context of grouped-by data. For example, grouping on a numeric field may trigger the availability of sort order controls including "0 on top," "9 on top," etc. In another example, grouping on an alphabetical field may trigger the availability of sort order controls including "A on top," "Z on top," etc. In still another example, grouping on a date field may trigger the availability of sort order controls including "newest on top," "oldest on top," etc. Similarly, grouping on a numeric field may trigger the availability of certain aggregation or other mathematical processing controls, such as "Compute total," "Compute minimum," "Compute maximum," "compute average", etc.

In an embodiment, modifications to a group-level outline panel result in real-time updates to records shown on the screen. As a result, users creating or modifying a group-level outline panel may receive instant feedback with regard to the effects of the action.

Figure 4:
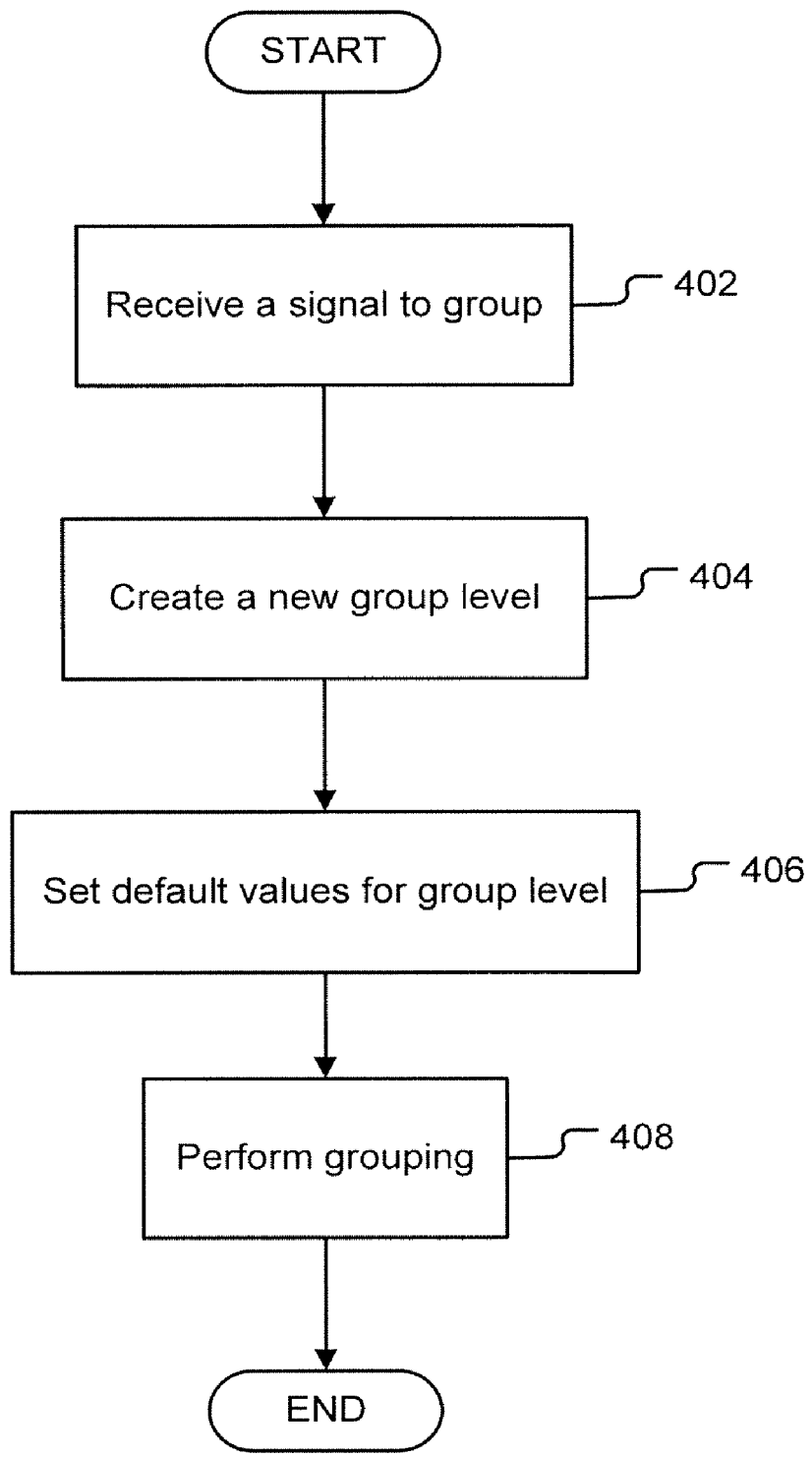
FIG. 4 illustrates the operational flow of the operations performed in one embodiment of the present invention.

FIG. 4 illustrates one embodiment of the invention in which a group is added via a group dialog. Receive operation 402 receives a signal to group records in a database. In one embodiment, a signal may be received from an input device such as a keyboard or mouse. In another embodiment, a signal may be received from an automated computer process. Upon receipt of a signal, receive operation 402 triggers create operation 404 to create a new group level.

Create operation 404 groups records by the selected field (discussed below in conjunction with FIG. 5). Create operation 404 also modifies group-level outline panel 318 (FIG. 3) to display frequently needed report modifier controls (320, 322, 324, 326, and 328, FIG. 3).

Set default operation 406 then sets default values for one or more report modifier controls. In one embodiment, only default values for the controls currently visible to the user are set, with the remaining controls being set upon the selection of more control 328 (FIG. 3). In another embodiment, all default control values are set, regardless of whether they will be immediately visible to the user. In an embodiment, a default value set by set default operation 406 represents the most frequently needed value for a control. In another embodiment, the default value set by set default operation 406 represents the most intuitive initial value for a control.

After set default operation 406 sets one or more default values, group operation 408 groups records according to those default values. In an embodiment, group operation 408 creates one or more queries associated with a report, and executes those queries. In an embodiment, group operation 408 creates an SQL query and executes it. While SQL is a predominant query language used today in database management systems, filter queries may be created in any query language including specialized versions of SQL such as HQL (Health Query Language), or query languages unrelated to SQL. Execution of a query may occur at the database management system level, or may be delegated to a lower-level program that accesses the database. Queries may be executed on the same system as the database management system is running, or sent out to one or more remote systems for execution. In the latter case, the remote system returns results, either directly or indirectly, to the database management system so that the results of the query may be displayed.

Group operation 408 next updates the display to reflect the new grouping, including updating the group-level outline panel to show the new grouping, and updating the records shown in the report. In one embodiment, group operation 408 updates the display by actually rendering a group-level outline panel or reported records on the screen. In an alternative embodiment, group operation 408 relies on application programming interfaces (APIs) or other indirect method of updating screen contents.

Figure 5:
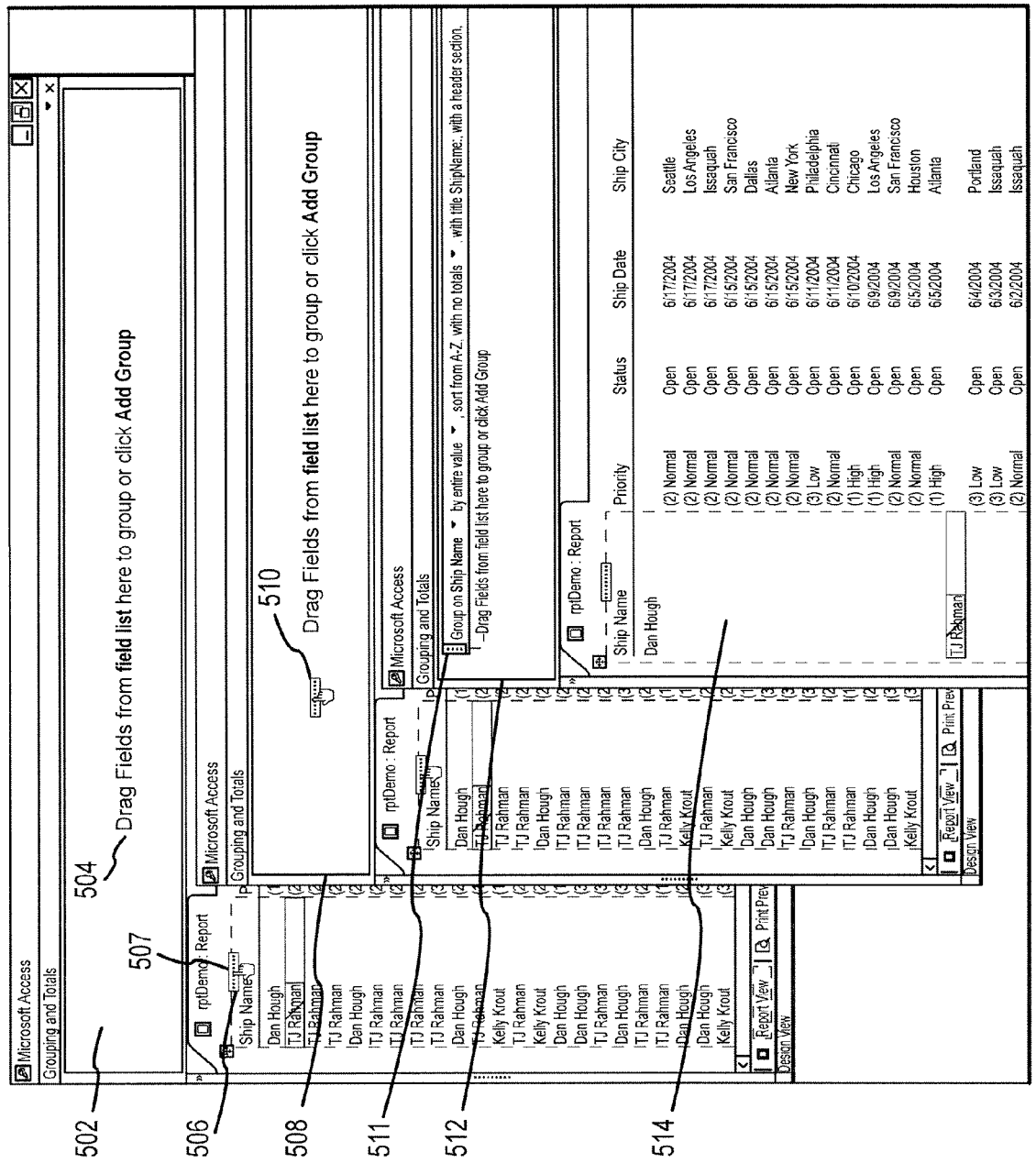
FIG. 5 illustrates example screenshots showing creation of a report, and results of report grouping.

FIG. 5 illustrates example screenshots showing creation of a report, and the results of a typical report grouping. Three overlapping database application windows 502, 508, and 512 can be seen in whole or in part, each depicting a stage of creating a grouping in one embodiment of the present invention.

Window 502 contains a drag prompt 504 that prompts a user to drag a column from a database table. A mouse pointer 506 can be seen selecting the Ship Name column, said column containing numerous ungrouped names. In an embodiment, drag prompt 504 may also be used to drag a column from an existing report to refine the grouping done by an existing report. In an embodiment, a handle 507 is presented to the user, the handle 507, e.g., a small box with dots displayed therein, providing the user a tangible item to select and drag in order to drag a column. Each column therefore may have a handle 507.

In window 508, the mouse pointer 510 can be seen dropping the Ship Name field onto drag prompt 504, having dragged the handle 507 there from its original position as seen in window 502.

In window 512, the results of the drag and drop operation can be seen. A group-level outline panel 511 grouping on Ship Name has appeared, along with a grouped report 514. Grouped report 514 lists each Ship Name value only once for each group of records. One skilled in the art will appreciate that this feature not only reduces redundant data from cluttering up a report, but also produces an easy-to-read hierarchical report format.

In an exemplary embodiment depicted in FIG. 5, drag prompt 504 and subsequent group-level outline panel information is displayed separately from tabular database data, such that prompts and group-level outline panels do not overlap the data. In contrast to traditional approaches to specifying a report, tabular data remains readable throughout the grouping process, providing additional feedback to users engaged in specifying a report.

Figure 6:
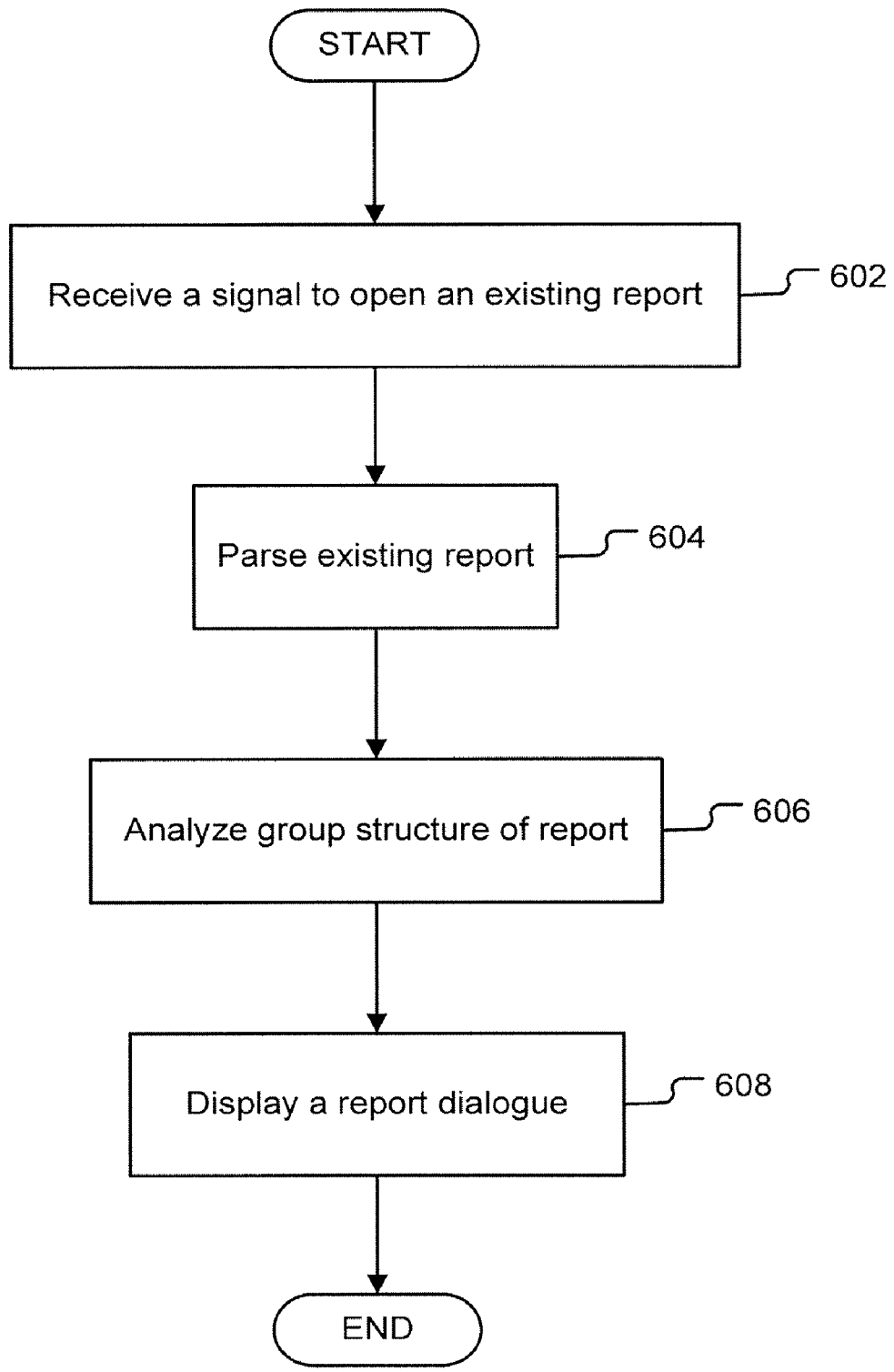
FIG. 6 illustrates the operational flow of the operations performed in another embodiment of the present invention.

FIG. 6 illustrates the operational flow of the operations performed in an embodiment of the present invention in which a report dialogue is generated from an existing database report. One skilled in the art will appreciate that the described operational flow may be used on a preexisting database report regardless of whether that preexisting database report was created by a database application that supports the disclosed report specification embodiments or the group-level outline panel embodiments discussed herein.

First, receive operation 602 receives a signal to open an existing report. As discussed above, the existing report need not have been created by an application containing the present invention. In an embodiment, an existing report may be in the form of a file. In another embodiment, an existing report may be in the form of a stream being received by a client from a database server. Receive operation 602 triggers parse operation 604 to read the report. Parse operation 604 then reads the existing report into memory.

Analyze operation 606 analyzes the report's structure, including the grouping hierarchy specified therein if one exists, and uses that structure as a model for building a corresponding group-level outline panel. If no grouping hierarchy is specified, embodiments of the invention may create a grouping hierarchy. Display operation 608 then renders the group-level outline panel in a report dialogue, along with any necessary group-level outline panel controls. The resulting report dialogue and group-level outline panel allow a user to easily edit an existing report of arbitrarily high complexity, regardless of the origin or creation method of the existing report. In one embodiment, display operation 608 also executes the existing report and organizes the displayed data records on the screen accordingly.

Figure 7:
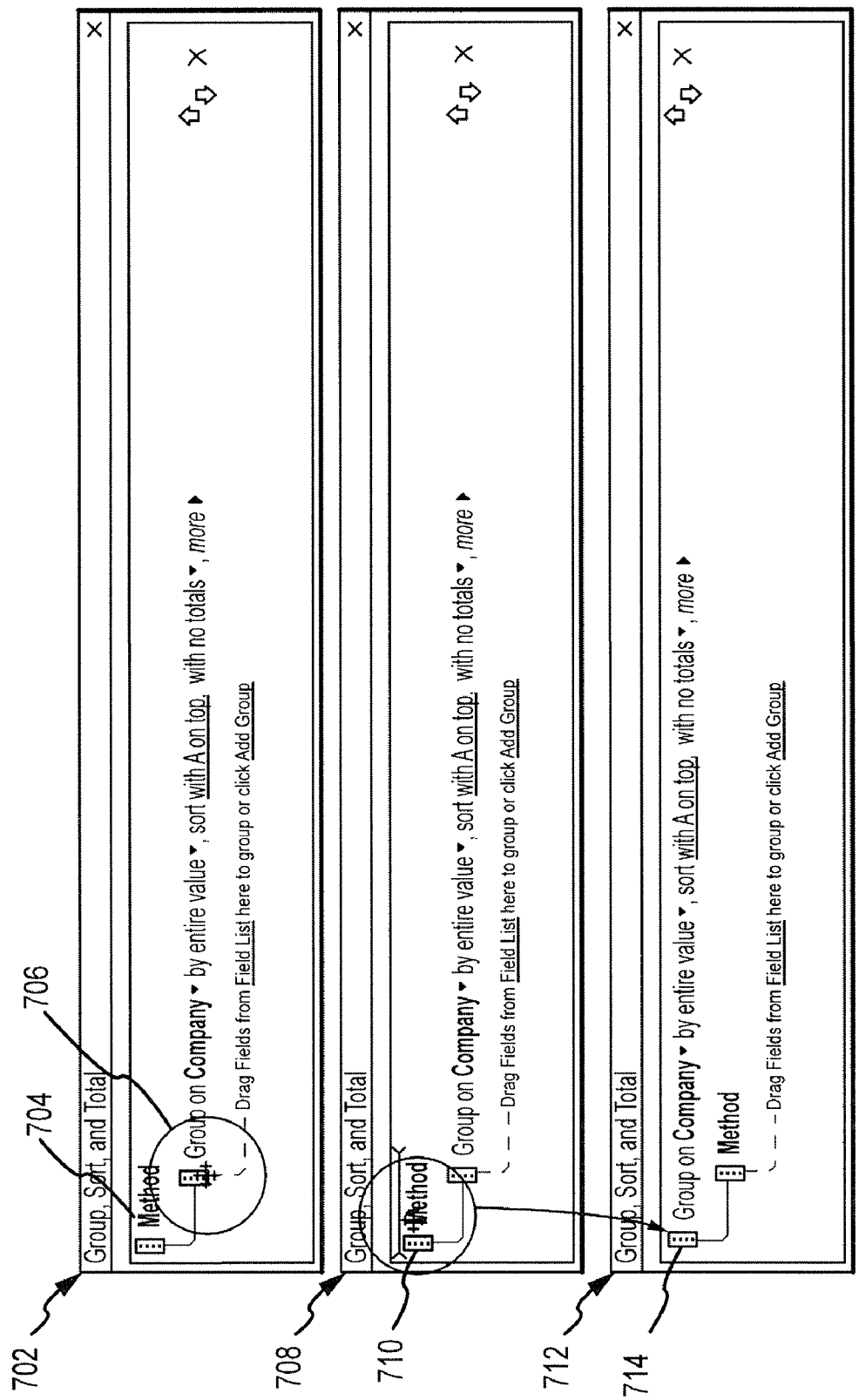
FIG. 7 illustrates example screenshots showing a report creation dialogue in which groupings may be reordered.

FIG. 7 illustrates example screenshots showing modification of a group-level outline panel in which two groups are present, and the order of those two groups is being changed. Since grouping is hierarchical in nature, which grouping is done first is very important. For example, grouping a table of customers by state, and then subsequently grouping by city, will produce an intuitive state/city breakdown in which each state has its own group containing subgroups for each of the state's cities. Conversely, grouping a table of customers by city, and then by state, will create a much less intuitive group for each city, containing subgroups for each state. For example, a city group for "Springfield" may contain subgroups for both Springfield, Mass., and Springfield, Ill. For this reason and others, the ability to easily reorder groups in a group-level outline panel, and thus, in a report, is provided.

Three dialogues 702, 708, and 712 can be seen. In one embodiment of the present invention, dialogue 702 includes a group-level outline panel 704 which includes a Method group, and below that, a Company group. A mouse pointer 706 is being used to select the Company group.

Dialogue 708 illustrates the Company group of group-level outline panel 704 having been dragged to the Method group of group-level outline panel 710 (as can be seen by the new position of the mouse pointer). When the Company group is dropped on the Method group, the resulting group-level outline panel 714 may be seen in dialogue 712. Group-level outline panel 714 reflects the new grouping ordering and resulting group hierarchy that will appear in the actual report (not shown).

In the exemplary embodiment presented above in conjunction with FIG. 7, only the currently selected group (in this case, Company) has a group-level outline panel including report controls displayed. In an alternate embodiment, report controls are present for all groups, not just the group currently selected.

Figure 8:
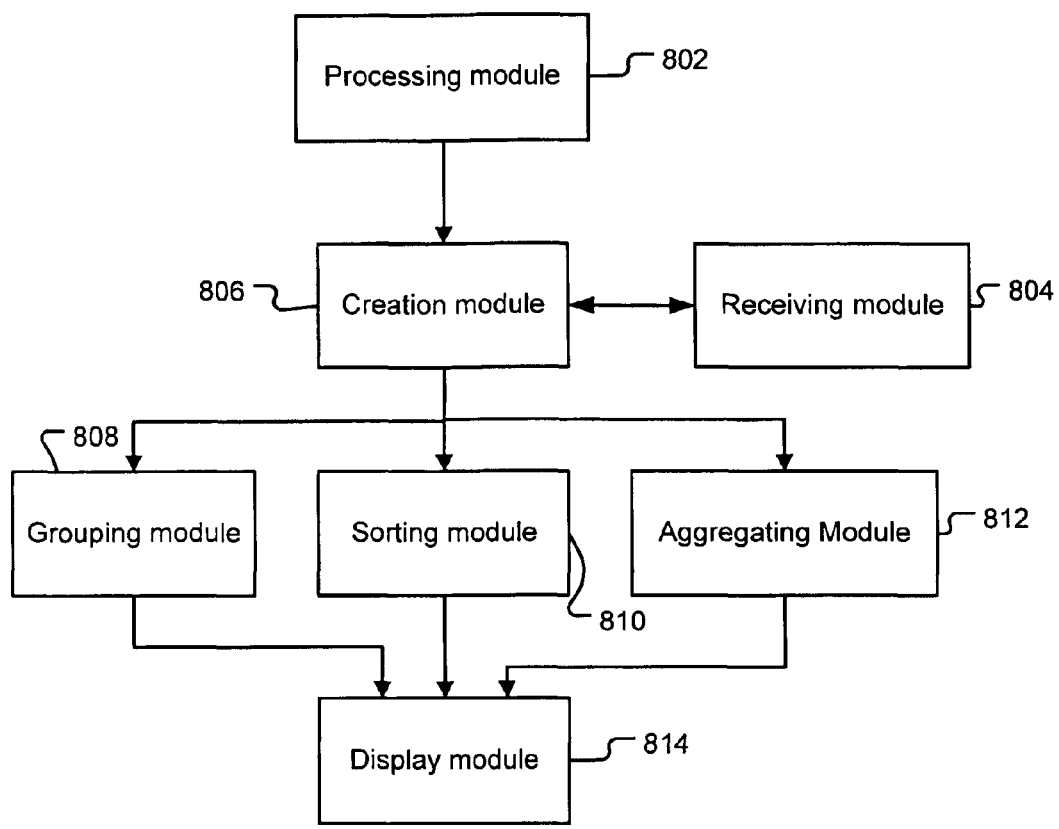
FIG. 8 illustrates the modules present in one embodiment of the present invention.

FIG. 8 illustrates the modules of one embodiment of the present invention. A processing module 802 processes an existing report and analyzes its structure. In an embodiment, processing module 802 may parse the record data directly. In another embodiment, processing module 802 may use a known parsing package such as "yacc" or "lex" to parse record data. The structure data gathered by processing module 802 then is passed to creation module 806 for group creation.

Alternatively or additionally, receive operation 804 may receive input from the user via a report design dialogue. Receive operation 804 may also adjust values for existing report controls via a group-level outline panel. Receive operation 804 sends received value adjustments to create operation 806 for implementation, and may also receive group-level outline panel data from create operation 806 so that the report design dialogue may be kept up to date.

In one embodiment, creation module 806 creates one or more group levels using the structure data received from processing module 802. In an alternate embodiment, creation module 806 creates one or more group levels using input received from receive operation 804. In yet another embodiment, creation module 806 creates one or more group levels using both structural data received from processing module 802, and user input from receive operation 804.

Creation module 806 then sets one or more default values for controls in each group level. As discussed previously, default values may be selected based on a variety of different criteria, including which value is most likely to be needed in the current context, which value is likely to be the most intuitive to the user, etc. Creation module 806 then sends the resulting group levels and control values to grouping module 808 for performance of the specified groupings.

Grouping module 808 performs one or more groupings according to the grouping specification data received from creation module 806. In one embodiment, grouping module 808 constructs and issues a query in a suitable query language such as SQL. In another embodiment, grouping module 808 performs grouping by directly accessing a data table. Grouping module 808 sends the results of a grouping to display module 814.

Sorting module 810 sorts one or more groupings according to the sorting specification received from creation module 806. In one embodiment, sorting module 810 constructs and issues a query in a suitable query language such as SQL. In another embodiment, sorting module 810 performs sorting by directly accessing a data table. In yet another embodiment, sorting module 810 performs sorting by directly accessing the results of an SQL query issued by grouping module 808. Sorting module 810 sends the results of a sorting to display module 814.

Aggregating module 812 performs aggregation or other numerical processing on one or more groupings according to the aggregation specification received from creation module 806. In one embodiment, aggregation module 812 constructs and issues a query in a suitable query language such as SQL. In another embodiment, aggregation module 812 performs aggregation by directly accessing a data table. In yet another embodiment, aggregation module 812 performs aggregation by directly accessing the results of an SQL query issued by grouping module 808. Aggregation module 812 sends the results of an aggregation to display module 814.

Display module 814 receives results of a grouping from grouping module 808, and displays those results on a screen. In one embodiment, display module 814 renders the results directly on the screen. In an alternate embodiment, display module 814 uses an API or other indirect method to display data on a screen. A grouping specification, sorting specification, or aggregation specification may subsequently be refined by a user via receiving module 804, discussed above.

In one embodiment, a grouping specification may contain other group-level attributes. For example, a sort direction attribute may control whether records in a given group are sorted in ascending order or descending order. In another exemplary embodiment, a keep together attribute may control whether records in the group are kept together when printed. Other group-level attributes are also contemplated.

Grouping module 808 may additionally perform intelligent visualization of intervals. In one exemplary embodiment, when customer name field is grouped by the first letter of the last name, a group heading specifying each starting letter will be generated at the beginning of each group. In another exemplary embodiment, when customer address field is grouped by city, a group heading specifying each city will be generated at the beginning of each group. This may be done to improve readability of a grouped report, and for other reasons. In an alternate embodiment, only the first record of each group will show the grouped-by data (see FIG. 5, where the Ship Name field includes only one entry for each group).

Figure 9:
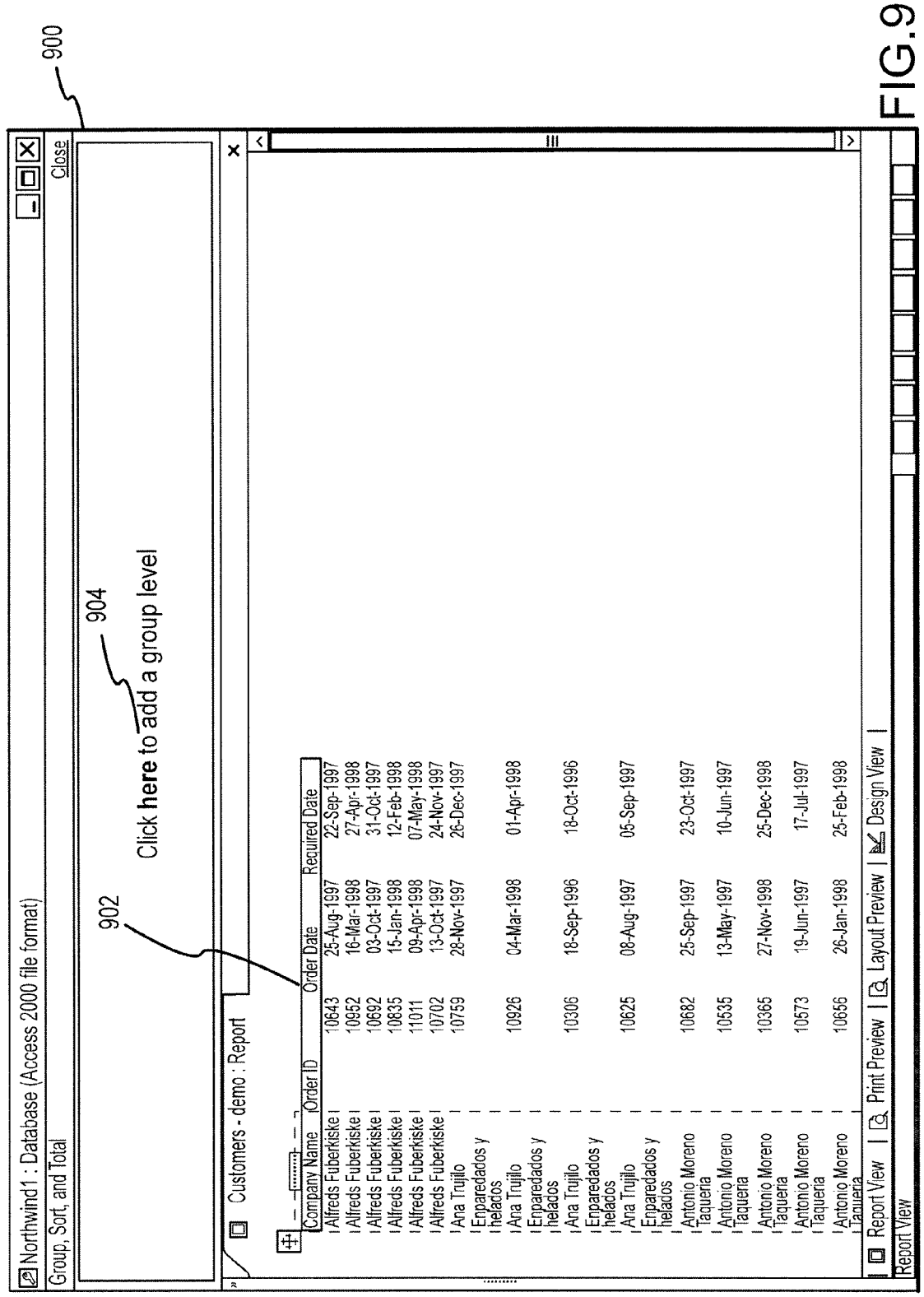
FIG. 9 illustrates an example screenshot showing a control for the creation of a grouping.

An embodiment of the invention relates to both the process and the user interface for group creation and FIGS. 9-12 illustrate exemplary screenshots for doing the same. FIG. 9 illustrates an example screenshot 900 showing a control 904 that is used to begin the process of creating a grouping. Control 904 is similar to control 304 (discussed above in conjunction with FIG. 3), and in an embodiment, may be clicked on or otherwise selected by a user to trigger the appearance of a group-level outline panel (not shown). Ungrouped data 902 may also be seen in screenshot 900.

Figure 10:
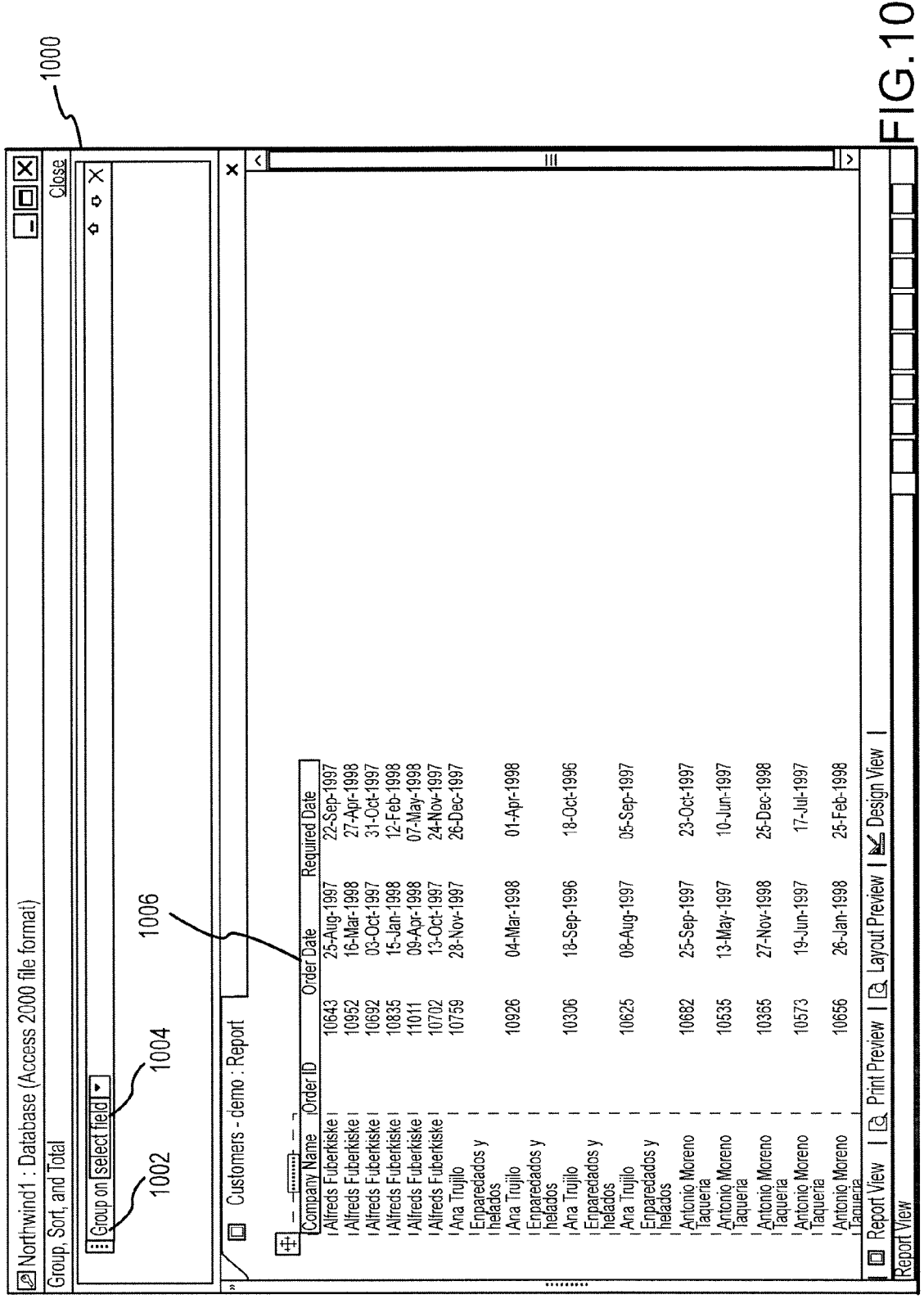
FIG. 10 illustrates an example screenshot showing a dialogue for the creation and modification of a grouping.

FIG. 10 illustrates an example screenshot 1000 showing a dialogue for the creation and modification of a grouping. A group-level outline panel 1002 (similar to group-level outline panel 308, discussed above in conjunction with FIG. 3) may be used to create and modify groups. Group-level outline panel 1002 has a prompt 1004 (similar to prompt 310, discussed above in conjunction with FIG. 3) which triggers a pulldown menu (not shown) to appear. Unsorted data 1006 is also visible in screenshot 1000.

Figure 11:
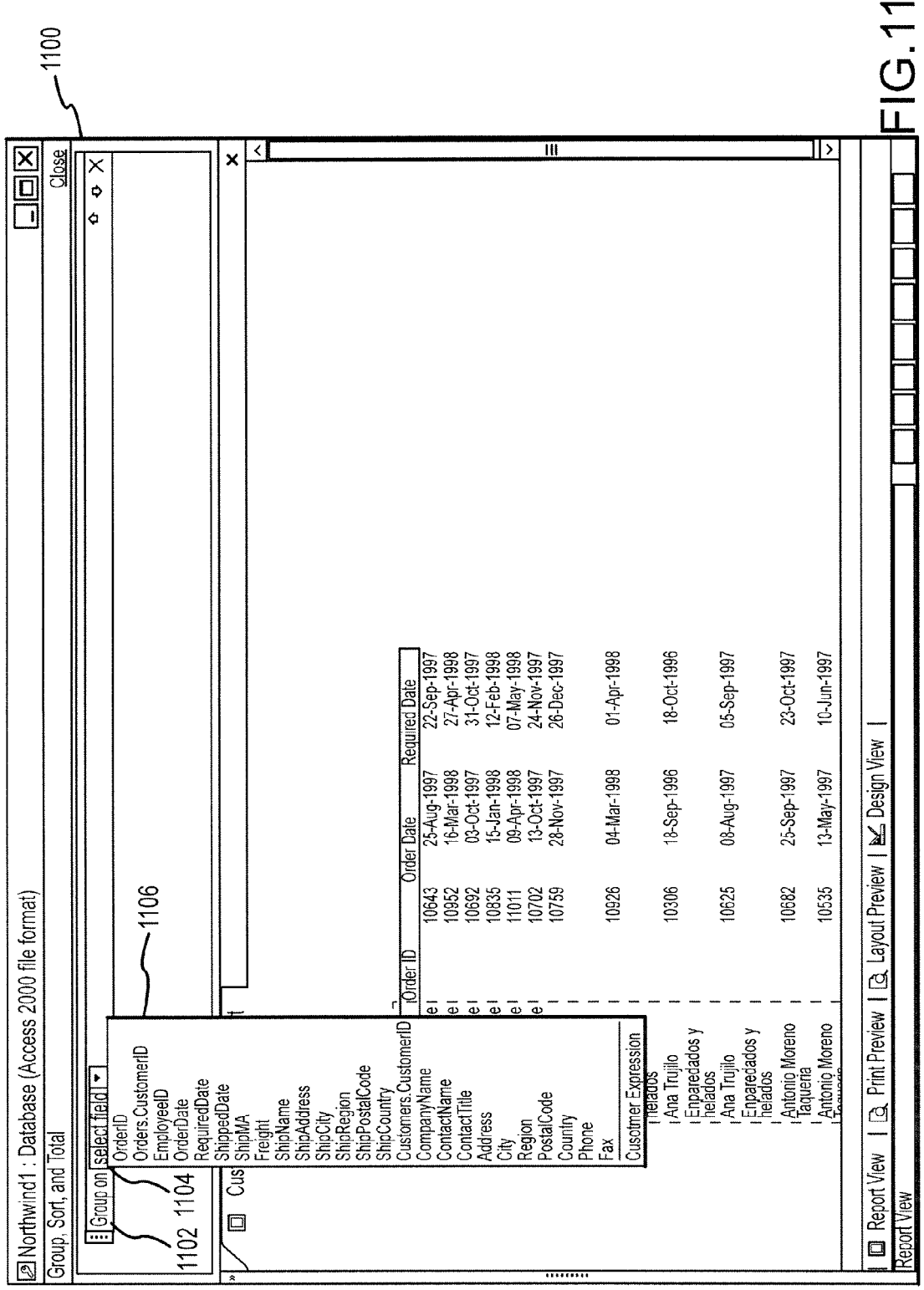
FIG. 11 illustrates an example screenshot showing a dialogue for the creation and modification of a grouping.

FIG. 11 illustrates an example screenshot 1100 showing a dialogue for the creation and modification of a grouping. A group-level outline panel 1102 has a prompt 1104, which may be used to trigger the presentation of a menu 1106. Menu 1106 contains a list of fields that users may group on. Selecting a given menu item (in pulldown menu 1106, CompanyName is highlighted) indicates that a grouping on CompanyName should be performed.

Figure 12:
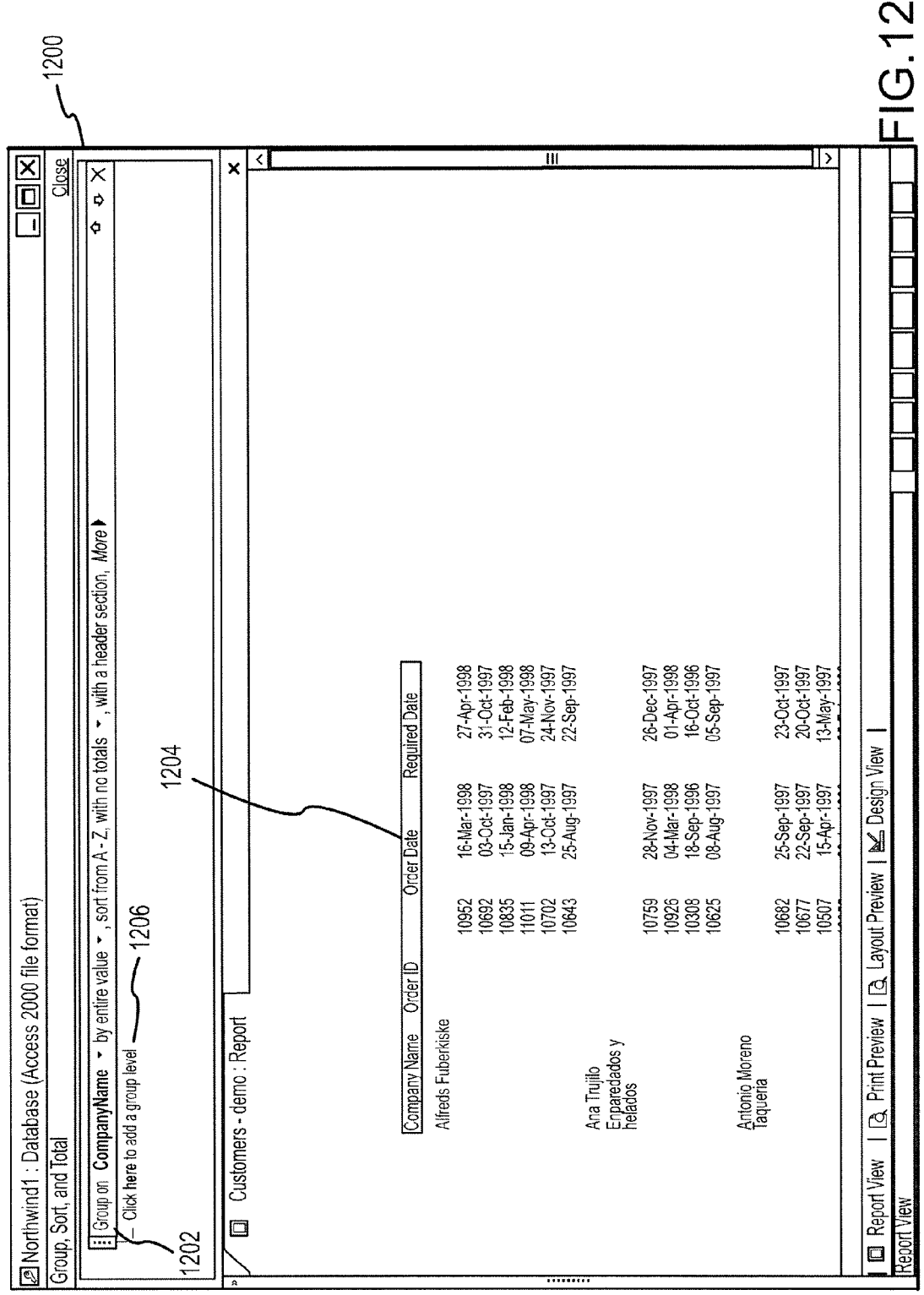
FIG. 12 illustrates an example screenshot showing a dialogue for the creation and modification of a grouping, and data resulting from the creation of a grouping.

FIG. 12 illustrates an example screenshot 1200 showing a dialogue for the creation and modification of a grouping, and data resulting from the creation of a grouping. A group-level outline panel 1202 reflects the new grouping (by CompanyName). Grouped data 1204 can also be seen. Grouped data 1204 is divided into groups according to values in the CompanyName field. In an embodiment, each CompanyName field appears once per group, as a group heading.

Figure 13:
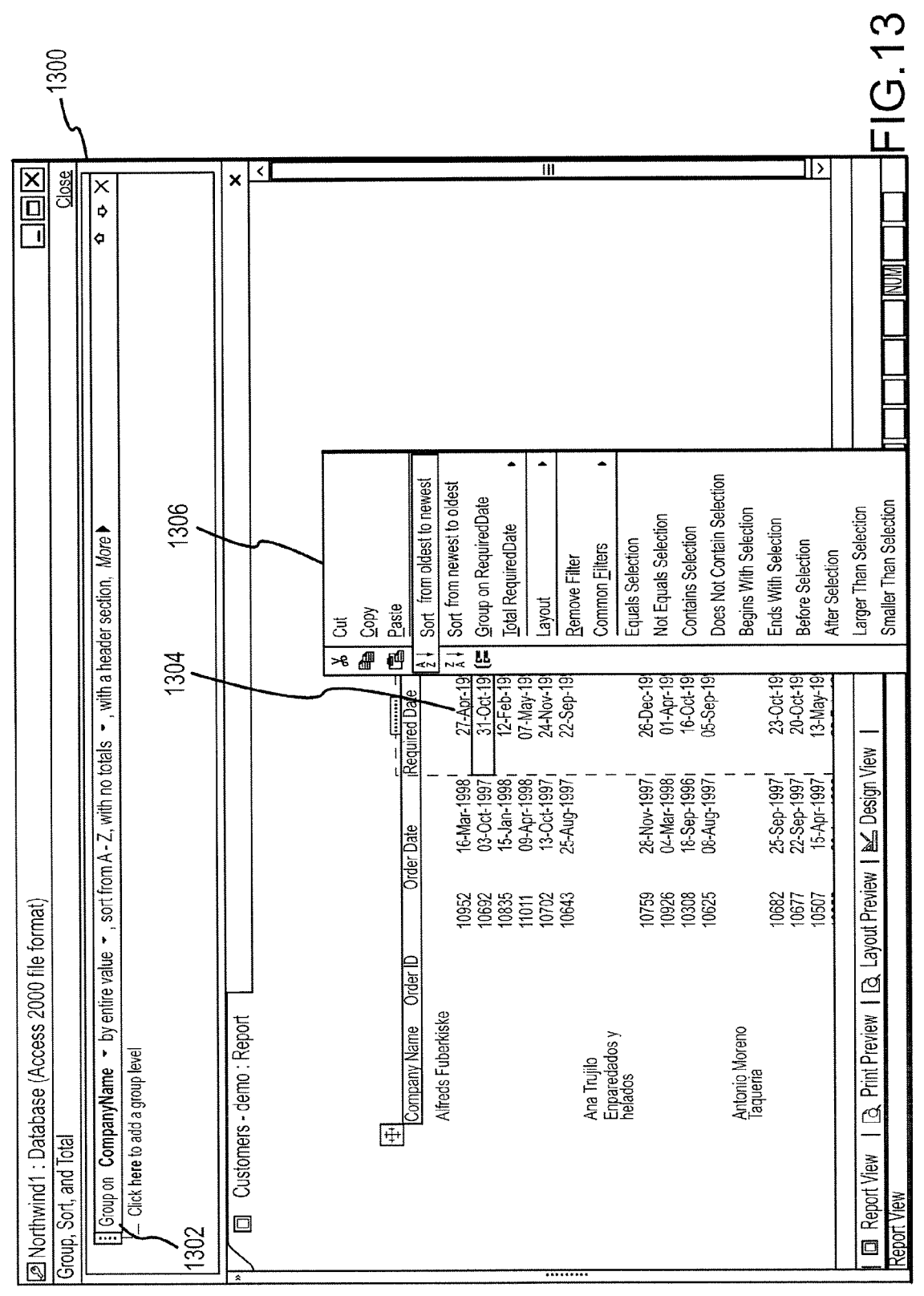
Figure 14:
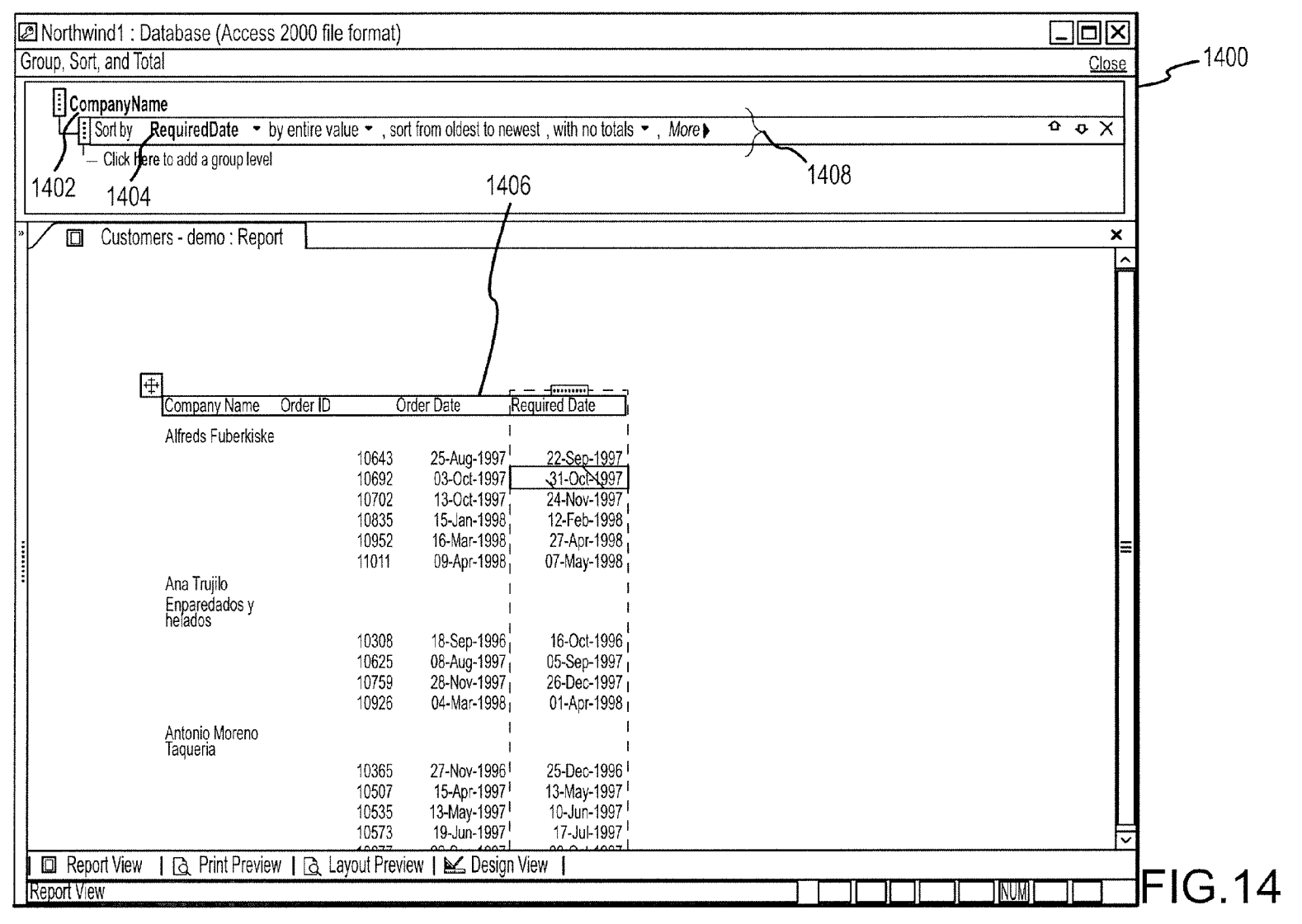

FIGS. 13-14 illustrate screenshots from an exemplary sort specification using one embodiment of the present invention. FIG. 13 illustrates an example screenshot 1300 showing contextual selection in a report creation dialogue. Group-level outline panel 1302 indicates that data is currently grouped on CompanyName, and the resulting groups are sorted from A-Z on field CompanyName. In an embodiment, right-clicking on date field 1304 triggers menu 1306 to appear. Menu 1306 contains numerous sorting options appropriate to a date field 1304, such as "sort from oldest to newest" and "sort from newest to oldest." In an embodiment, menu 1306 may also contain contextually appropriate grouping and/or aggregation options. In yet another embodiment, menu 1306 may also contain generally-applicable sorting and/or grouping and/or aggregation options. While right-clicking is used to select a field in the exemplary embodiment described above, other selection methods are also envisioned, such as keystroke combinations from a keyboard or other input.

FIG. 14 illustrates an example screenshot 1400 showing contextual selection in a report creation dialogue. In response to selecting the RequiredDate field (see FIG. 13) and then "sort from oldest to newest" from the resulting menu 1306 (FIG. 13), a resulting group-level outline panel 1402 may be seen. Group-level outline panel 1402 has the newly added sort control 1404. Sort control 1404 indicates that data within the CompanyName groupings will be sorted by the RequiredDate field, from oldest to newest. Grouped and sorted data 1406 reflects the sort, with dates in each group being sorted from oldest to newest.

Comparing FIGS. 13 and 14 illustrates another aspect of some embodiments of the present invention. That is, some embodiments of the present invention identify and display information and associated controls likely to be used or needed to build a report while hiding other controls. Yet other embodiments further this concept to display only the details of a selected group level of the group-level outline panel. For instance, in FIG. 13, group-level outline panel 1302 is selected and such panel is expanded to show relevant controls. FIG. 14, however, illustrates a group level control 1404 that is, in an embodiment, part of a sub-group level 1408. The sub-group level 1408 may be independently selected, and when selected, only controls associated with the group level 1408 are displayed, while those associated with group level 1402 are hidden. Such limited display reduces clutter and reduces potential confusion, such as when many group levels exist, thereby making it easier for users to discern which phrases are relevant to their current selection.

Figure 15:
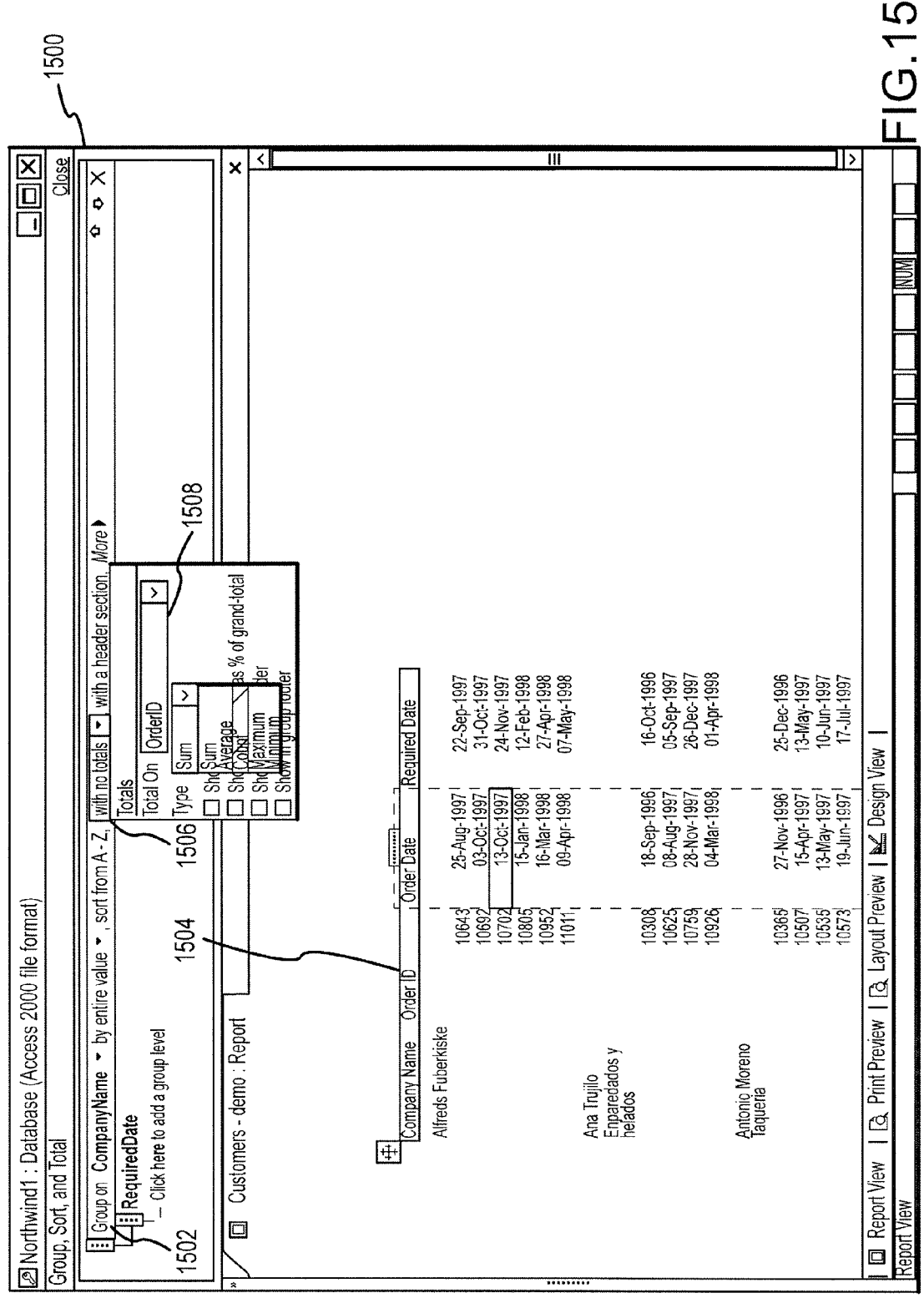
FIG. 15 illustrates an example screenshot showing a dialogue for the creation and modification of a group total.
Figure 16:
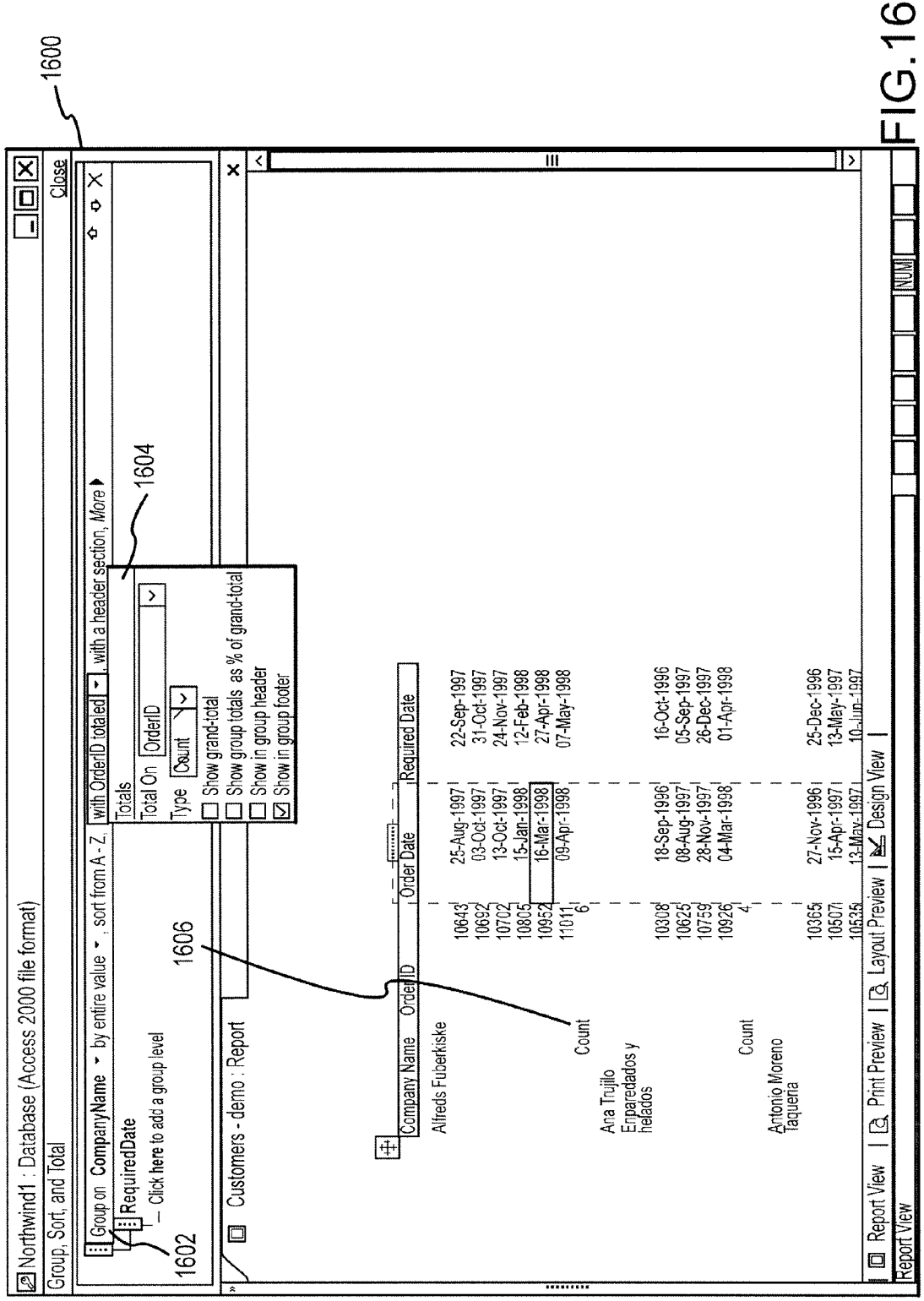
FIG. 16 illustrates an example screenshot showing a dialogue for the creation and modification of a group total, and data resulting from the specification of a total.

FIGS. 15-16 illustrate screenshots from an exemplary aggregation specification using one embodiment of the present invention. FIG. 15 illustrates an example screenshot 1500 showing a dialogue for the creation and modification of a group total. Group-level outline panel 1502 indicates that data grouping is done on the CompanyName field, and as can be seen by prompt 1506, no totals are computed. Unaggregated data 1504 can also be seen in screenshot 1500. Selecting prompt 1506 triggers the presentation of a menu 1508 of aggregation options, including "sum," "average," "count," "minimum," and "maximum."

FIG. 16 illustrates an example screenshot 1600 showing a dialogue for the creation and modification of a group total, and data 1606 resulting from the specification of a total. As indicated by menu 1604, aggregation of type Count on the OrderID field has been specified. The resulting data 1606 includes a "count" footer for each group indicating the total number of records in that group. In an embodiment, an "average" aggregation specification (not pictured) results in an "average" footer (not pictured) for reach group indicating the average of the data in the specified field for a group. Similarly, a sum footer may be used to indicate a numerical total across a given group, and minimum and maximum footers may be used to indicate the smallest and largest values, respectively, in a given group.

Figure 18:
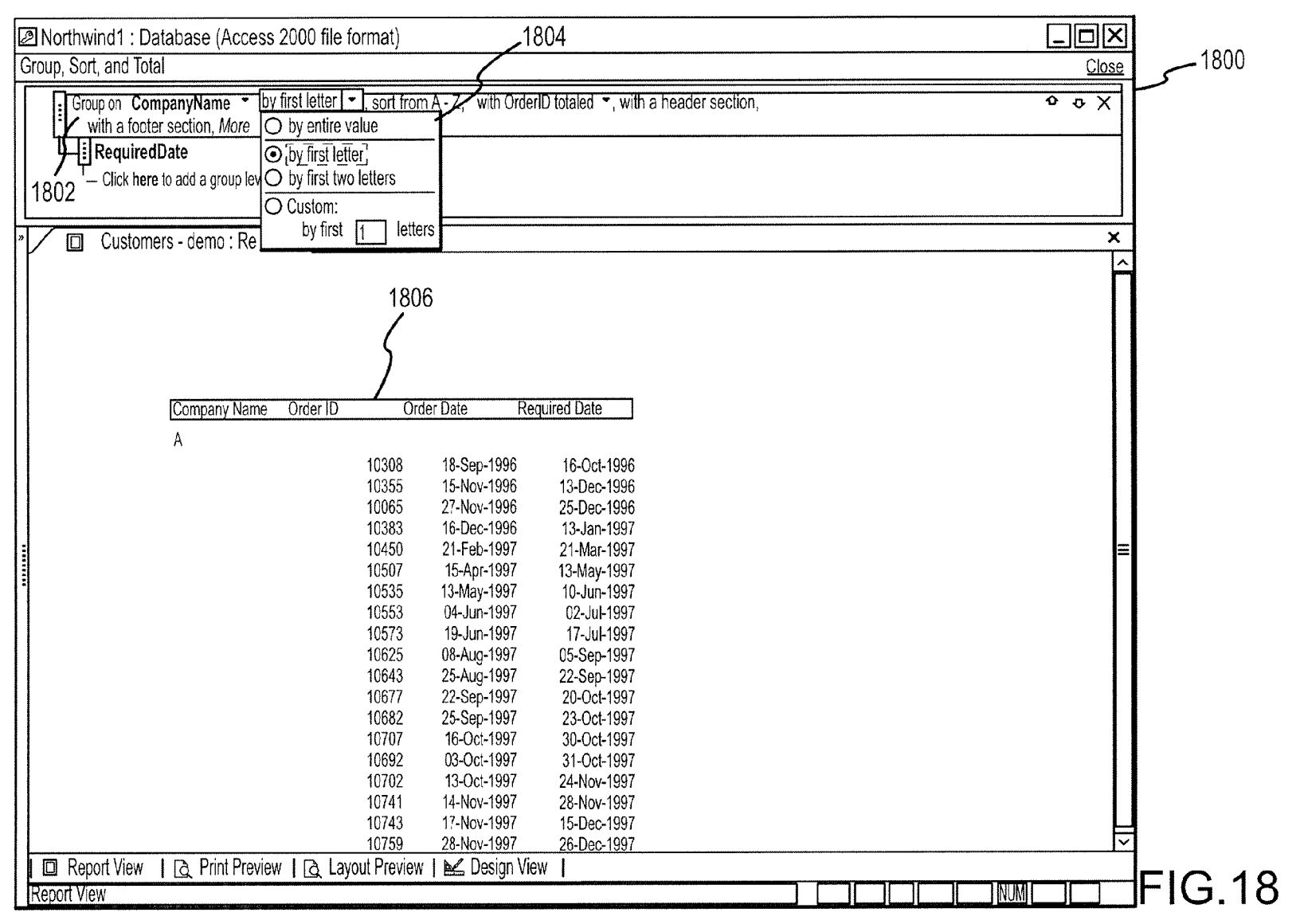

FIGS. 17-18 illustrate screenshots from an exemplary grouping refinement using one embodiment of the present invention. FIG. 17 illustrates an example screenshot 1700 showing a dialogue for the creation and modification of a grouping, and a prompt 1704 for the refinement of a grouping. Group-level outline panel 1702 indicates that grouping is done on the CompanyName field, and as can be seen by prompt 1704, grouping is done by the entire value of CompanyName. In response to a user selecting prompt 1704, a menu 1706 of grouping refinements contextually appropriate to CompanyName (an alphanumeric field) is presented. Exemplary contextually appropriate refinements include "by first letter," "by first two letters," and a "custom" control for specification of an arbitrary number of first letters. CompanyName groups grouped by entire value can be seen in data 1708.

FIG. 18 illustrates an example screenshot 1800 showing a dialogue for the creation and modification of a grouping, and data 1806 resulting from a refinement of a grouping. Group-level outline panel 1802 has a menu 1804 that indicates grouping "by first letter" has been selected. The resulting groupings can be seen in data 1806. As can be seen in data 1806, groups of companies with names starting with "A" have been consolidated into a single "A" group. Other groups (not pictured) may have been similarly consolidated. The corresponding group heading has also been changed to "A."

Other contextually appropriate grouping refinements are also envisioned, such as "by day," "by month," and "by year" for date fields, and/or "by first digit," "by first two digits," etc. for numeric fields, and so on. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for specifying and modifying reports using a plurality of report design dialogues, the system comprising:
at least one processing unit for executing computer executable instructions; and
memory storing computer executable instructions that when executed by the at least one processing unit provide:
a receiving module for receiving, through the use of a group-level outline panel, report control signals and selections for performing a database grouping, wherein the group-level outline panel is displayed in a first report design dialogue, the group-level outline panel in the first report design dialogue comprising a prompt for selection of a database field on which to group, wherein, following the selection of the prompt, the group-level outline panel is displayed in a second report design dialogue replacing the first report design dialogue, the group-level outline panel in the second report design dialogue comprising a pulldown menu listing database fields by which records may be grouped, wherein, following selection of a first database field, the group-level outline panel is displayed in a third report design dialogue replacing the second report design dialogue, wherein the group-level outline panel in the third report design dialogue is expanded to include a plurality of report controls;
a creation module for creating a new group level and setting default values for the new group level;
a grouping module for performing the database grouping based on the first database field selected;
a sorting module for performing a database sorting;
an aggregating module for performing a database aggregation; and
a display module for displaying the group-level outline panel, and displaying results of the database grouping.

2. A system as defined in claim 1, wherein the grouping module creates a query in a query processing language and issues the query.

3. A system as defined in claim 1, wherein the display module displays the group-level outline panel without obscuring other database data.

4. A system as defined in claim 1, wherein the grouping module presents a menu of one or more appropriate grouping options based on the context of a selected field.

5. A system a defined in claim 1, wherein the sorting module presents a menu of one or more appropriate sorting options based on the context of a selected field.

6. A system as defined in claim 1, wherein the aggregation module presents a menu of one or more appropriate aggregation options based on the context of the first database field selected.

7. A system as defined in claim 1, wherein the plurality of report controls in the expanded group-level outline panel comprises frequently-needed controls.

8. A system as defined in claim 7, wherein the plurality of report controls in the expanded group-level outline panel comprises report controls based on a context of the database grouping based on the database field selected in the group-level outline panel.

9. A system for specifying and modifying reports using a report design dialogue, the system comprising:
at least one processing unit for executing computer executable instructions; and
memory storing computer executable instructions that when executed by the at least one processing unit provide:
a processing module for processing an existing report, wherein the processing comprises parsing the existing report and analyzing a structure of the existing report, wherein the processing module passes structural data to a creation module;
a receiving module for receiving, through the use of a group-level outline panel, report control signals and selections for performing a database grouping, wherein the group-level outline panel is displayed in the report design dialogue, the group-level outline panel in the report design dialogue comprising a prompt for selection of a database field on which to group, wherein, following the selection of the prompt, the group-level outline panel is updated to comprise a pulldown menu listing database fields by which records may be grouped, wherein, following selection of a first database field, the group-level outline panel is expanded to include a plurality of report controls, and wherein the plurality of report controls in the expanded group-level outline panel comprises report controls based on a context of the database field selected;
a creation module for creating one or more group levels using the structural data received from the processing module and the control signals and selections received from the receiving module;
a grouping module for performing the database grouping based on the group levels received from the creation module;
a sorting module for performing a database sorting;
an aggregating module for performing a database aggregation; and
a display module for displaying the group-level outline panel, and displaying results of the database grouping.

10. The system as defined in claim 9, wherein the aggregating module performs the database aggregation according to aggregation specification received from the creation module.

11. The system as defined in claim 9, wherein the aggregating module constructs and issues a query in a query language.

12. The system as defined in claim 9, wherein the sorting module performs the database sorting according to sorting specification received from the creation module.

13. The system as defined in claim 9, wherein the sorting module performs the database sorting by accessing results of a query issued by the grouping module, wherein the query is issued in a SQL query language.

14. The system as defined in claim 9, wherein the sorting module performs the database sorting by directly accessing a data table.

15. The system as defined in claim 9, wherein the receiving module receives group-level outline panel data from the creation module to update the group-level outline panel.

16. The system as defined in claim 9, wherein modifications to the group-level outline panel result in real-time updates to the displayed results of the database grouping.

* * * * *